United States Patent [19]

Brede et al.

[11] Patent Number: 5,330,730
[45] Date of Patent: Jul. 19, 1994

[54] GAS GENERATOR FOR AN INFLATABLE IMPACT CUSHION FOR PROTECTING AN OCCUPANT OF A MOTOR VEHICLE FROM INJURY

[75] Inventors: Uwe Brede, Furth; Josef Kraft, Berg; Wolfram Seebeck, Veitsbronn, all of Fed. Rep. of Germany

[73] Assignee: Dynamit Nobel AG, Troisdorf, Fed. Rep. of Germany

[21] Appl. No.: 967,398

[22] Filed: Oct. 28, 1992

[30] Foreign Application Priority Data

Oct. 28, 1991 [DE] Fed. Rep. of Germany ....... 4135547

[51] Int. Cl.$^5$ ............................................. B01J 7/00
[52] U.S. Cl. .................................... 422/305; 280/736; 280/737; 422/165
[58] Field of Search .................... 422/305, 165, 166; 280/736, 737, 740, 741; 102/530, 531

[56] References Cited

U.S. PATENT DOCUMENTS

| 3,689,105 | 9/1972 | Matsui et al. ................... 280/737 |
| 3,690,695 | 9/1972 | Jones ................................ 280/741 |
| 3,810,655 | 5/1974 | Pracher ............................ 280/736 |
| 4,050,483 | 9/1977 | Bishop ............................. 280/737 |
| 5,031,932 | 7/1991 | Frantom et al. .................. 280/737 |
| 5,033,772 | 7/1991 | Frantom et al. .................. 280/737 |
| 5,060,973 | 10/1991 | Giovanetti ....................... 280/736 |
| 5,226,667 | 7/1993 | Coultas ............................ 280/736 |

FOREIGN PATENT DOCUMENTS

2235817 7/1974 France .

Primary Examiner—James C. Housel
Assistant Examiner—Laura E. Collins
Attorney, Agent, or Firm—Antonelli, Terry, Stout & Kraus

[57] ABSTRACT

Gas generator for an inflatable impact cushion for protecting an occupant of a motor-vehicle from injury, has a housing, in which is formed a storage chamber for liquified gas. The storage chamber is separated by a partition wall from a combustion chamber also formed in the housing. An ignition device is positioned in a precombustion chamber, and has an ignition charge to generate combustion gases during ignition. In the precombustion chamber there is guided, in a displaceable manner, a piston which, because of the combustion gases of the ignition charge, moves into and through the combustion chamber in a direction of the partition wall, in order to penetrate the partition wall. When the partition wall is penetrated there is a connection between the storage chamber and the combustion chamber by way of a liquified gas channel system so that liquified gas can flow into the combustion chamber. At the same time a connection is created between the precombustion chamber and the (main) combustion chamber by way of ignition channels formed in the piston. Hot combustion gases of the ignition charge ignite the liquified gas. The rising internal pressure in the combustion chamber causes displacement of the longitudinally displaceably guided partition wall, which moves together with the piston and thereby continuously forces liquid gas from the storage chamber into the combustion chamber. The combustion gases emerge, through outlet openings in the housing.

17 Claims, 4 Drawing Sheets

GAS GENERATOR FOR AN INFLATABLE IMPACT CUSHION FOR PROTECTING AN OCCUPANT OF A MOTOR VEHICLE FROM INJURY

BACKGROUND OF THE INVENTION

This invention relates to a gas generator, particularly for use with an inflatable impact cushion for protecting a passenger in a motor vehicle from injury, the generator comprising a housing, a combustible liquified gas mixture located therein for generating gas under pressure, and an ignitable ignition charge, This invention also relates to a gas generator for inflating an inflatable impact cushion to protect an occupant of a motor vehicle from injury which has a housing, a combustible gas-producing liquified gas mixture for generating pressure gas accommodated in the housing, an ignitible ignition charge for igniting the liquified gas mixture and a combustion chamber arranged in the housing in which the liquified gas mixture burns, with the resulting pressure gas emerging from the combustion chamber by way of at least one outlet opening in a housing wall.

With the gas generators used at present for inflatable impact cushions of motor vehicles (also termed "Airbags") a charge in the form of solid tablets or discs is used as a combustible gas-producing material, On ignition, this solid gas-generating charge produces the useful pressure gas or gas under pressure for inflating the impact cushion. A disadvantage caused by combustion of solid gas-producing materials is that quite a large amount of slag is formed during the combustion, which represents more than 50% of the mass of the gas-generating gas charge used. Because of the slag and dust formation during combustion, expensive filter stages in the gas generator are necessary in order to hold back the slag and the dust particles. Otherwise when these particles emerge, the impact cushion would be damaged and the occupants of the vehicle placed in danger.

As an alternative to generators containing solid materials, there are generators containing compressed gases or air. In order to form a sufficient volume of gas, very high charge pressures are necessary as cooling takes place on discharge of the gases and no increase in volume can be achieved by exothermic reactions such as with solid matter mixtures.

SUMMARY OF THE INVENTION

A primary object of the invention is to create a gas generator, particularly for an inflatable impact cushion for protecting a motor vehicle occupant from injury, in which slag-retaining devices are not necessary.

In order to achieve this object a gas generator of the type heretofore mentioned is provided in which a combustible liquified gas is used as a gas-producing material, which liquified gas is ignited to produce a pressure gas for inflating the impact cushion.

The gas generator according to the invention has a housing in which a liquified gas as gas-producing material is placed in a storage chamber. The liquified gas is a material which under normal conditions (room temperature and normal pressure) is in the gaseous state and which, because of the pressure under which the material is maintained in the storage chamber, is liquified. This liquified gas under pressure is injected in a controlled manner into the combustion chamber of the housing adjacent to the storage chamber. Shortly before or when the liquified gas is admitted into the combustion chamber, an ignition device is activated by means of an ignition charge. The ignition vapors and hot combustion gases ignite the liquified gas which evaporates or volatilizes because of the expansion occurring in the combustion chamber. The combustible liquified gas burns in the combustion chamber without leaving solid particles behind. Filter stages which are usually positioned in front of at least one outlet opening of the gas generator housing wall can therefore be omitted in the gas generator according to this invention. If filter-type stages are provided, these serve exclusively the purpose of cooling the generated gases. The cooling can, however, also occur in another manner, perhaps, by connecting to the combustion chamber a distributor chamber of the housing from which the combustion gases reach the outside by way of at least one outlet opening.

One embodiment of the present invention is a gas generator, particularly for inflating an inflatable impact cushion for protecting motor vehicle passengers, which comprises a housing, a gas-producing liquified gas located therein for generating gas under pressure and an ignitible ignition charge for igniting the liquified gas, wherein the liquified gas comprises a mixture of one or several short-chain hydrocarbons and nitrogen monoxide ($N_2O$).

In accordance with the invention, liquified gas mixtures are proposed having a low charge pressure, which mixtures, as a result of exothermic action, produce on combustion a multifold increase in volume and do not require any filters. In order to avoid high charge pressures, oxygen gas or air is dispensed with, i.e. is avoided, as an oxidizing agent. In using nitrogen monoxide (laughing gas), a gas is provided which is easily liquified (critical pressure: 72.7 bar, critical temperature 36.4° C.). The capacity for oxidation with nitrogen monoxide is double that of air and, in contrast to pure oxygen or air, laughing gas behaves as an inert gas up to at least 200° C., as a result of which quiescent oxidizing processes are prevented from occurring even with storage at relatively high temperatures.

Preferred hydrocarbons for the purpose of the present invention are those which are selected from the group consisting propane, n-butane and i-butane as well as mixtures thereof. A particularly preferred hydrocarbon for the purpose of the present invention is industrial butane, which comprises a mixture of n-butane and i-butane (isobutane).

The ignitibility of nitrogen monoxide-hydrocarbon mixtures is obtained within a wide range of proportions of each component. For example, mixtures containing from 97.5% by weight of nitrogen monoxide and 2.5% by weight butane (industrial) to 70% by weight nitrogen monoxide and 30% by weight butane are exceptionally good at igniting. The thermal stability of nitrogen monoxide-butane mixtures satisfies all requirements which are made in the automobile field. In ignition tests with an incandescent wire the explosion of the mixtures does not occur before reaching a wire temperature of more than 500° C.

The weight ratio of hydrocarbon to nitrogen monoxide is preferably adjusted to be such that the inflated impact cushion contains a non-combustible gas mixture. Correspondingly, the weight ratio of hydrocarbon to nitrogen monoxide should be adapted to the stoichiometric ratios for a complete (as far as possible) combustion of the hydrocarbon. Advantageously, the nitrogen monoxide is used in a slight excess relative to the hydrocarbon. The reaction products than consist substantially of gaseous substances ($CO_2$, $H_2O$ and $N_2$) and are admixed with residual components of hydrocarbon and/or nitrogen monoxide which, if the case arises, are present, for example when using propane or butane and laughing gas. A particularly suitable mixing ratio for the components butane and nitrogen monoxide is a weight ratio of butane to nitrogen monoxide of 5:95 parts by weight. It will be understood that nitrogen monoxide functions here as an oxygen generator.

For special applications, where it should be necessary to deviate from the stoichiometric ratio, a catalytic secondary reaction may be appropriate in order to reduce proportions of a gas which are detrimental to health; for example, by use of a catalyst formed of a suitable material in the form of throughflow screen.

The speed of reaction, particularly with higher charge masses in liquified gas containing can be controlled surprisingly within wide limits by adding inert gases, particularly physiologically harmless gases with a low characteristic pressure. It is therefore particularly preferable to select the inert gas from carbon dioxide and/or xenon. The inert gases named can, for example, be used in a quantity of 10 to 80% by weight relative to the mixture of hydrocarbon, as used herein (the term "hydrocarbon" includes propane, n-butane and i-butane, as well as mixture thereof) and nitrogen monoxide. Carbon dioxide, as is known, can be condensed as easily as nitrogen monoxide (critical pressure: 73.8 bar, critical temperature: 31.0° C.). The inert gas, particularly carbon dioxide acts for the purpose of the present invention as a reaction moderator. Carbon dioxide has significantly more favorable properties than, for example, nitrogen or other inert gases, the application of which should however not be ruled out.

According to the invention the liquified gas mixture can be composed of 14 to 97.5% by weight of nitrogen monoxide, 0.5 to 27% by weight hydrocarbon and up to 80% by weight of the inert gas; the percentages by weight of these components being equal to 100% by weight of the liquid gas to be used in a gas generator. In detail, for example, the following compositions can be used:

| Composition I: | |
| --- | --- |
| Nitrogen monoxide | 90% by weight |
| Hydrocarbon | 10% by weight |
| Composition II: | |
| Nitrogen monoxide | 70% by weight |
| Hydrocarbon | 30% by weight |
| Composition III: | |
| Nitrogen monoxide | 97.5% by weight |
| Hydrocarbon | 2.5% by weight |
| Composition IV: | |
| Nitrogen monoxide | 14% by weight |
| Hydrocarbon | 6% by weight |
| Inert gas | 80% by weight |
| Composition V: | |
| Nitrogen monoxide | 59.4% by weight |
| Hydrocarbon | 6.6% by weight |
| Inert gas | 34% by weight |
| Composition VI: | |
| Nitrogen monoxide | 19.5% by weight |
| Hydrocarbon | 0.5% by weight |
| Inert gas | 80% by weight |
| Composition VII: | |
| Nitrogen monoxide | 87.75% by weight |
| Hydrocarbon | 2.25% by weight |
| Inert gas | 10% by weight |
| Composition VIII: | |
| Nitrogen monoxide | 63% by weight |
| Hydrocarbon | 27% by weight |
| Inert gas | 10% by weight |

The explosion temperature of the mixtures according to the invention is approximately 3000° C.; an exponential increase in the volume therefore occurs with the reaction. The adaption of the kinetics to the respective airbag-system can be adjusted by varying the quantity of the reaction moderator, in particular the quantity of carbon dioxide.

In another embodiment of the gas generator, the sequence with respect to time in which the ignition vapors of the ignition charge as well as the liquified gas are admitted into the combustion chamber, occurs advantageously by means of an element in the form of a piston displaced forward during combustion of the ignition charge by the rise or increase in pressure occurring during combustion. The piston moves in the direction of a partition wall separating the storage chamber from the combustion chamber when the ignition charge is ignited and penetrates this wall locally. The front end of the piston in the direction of movement is formed such that, when the piston penetrates the partition wall, liquified gas enters the combustion chamber from the storage chamber. On the other hand, the rear end of the piston is so formed that the combustion gases of the ignition charge enter the combustion chamber when the piston is driven with its front end into the partition wall. With a single element, namely the piston, an accurate control with respect to time of the penetration of liquified gas and combustion gases is achieved in a comparatively simple manner. The design of the ends of the piston can therefore be influenced so that either the liquified gas or the combustion gases of the ignition charge flows into the combustion chamber first or both flow simultaneously.

In order to introduce the liquified gas and the combustion gases into the combustion chamber, there are advantageously provided on the ends of the piston at least one liquified gas channel and at least one ignition gas channel. When the front piston end penetrates the partition wall, the storage chamber is connected by way of at least one liquified gas channel to the combustion chamber; the liquified gas under a certain excess pressure arrives by way of the liquified gas channel from the storage chamber in the combustion chamber. At its rear end, the piston is provided with at least one ignition gas channel, by way of which the combustion chamber is connected to a precombustion chamber in which the ignition device is accommodated with the ignition charge.

The piston is preferably guided displaceably in the precombustion chamber, in the course of which it rests on an inner face of the wall defining the precombustion chamber. This precombustion chamber opens into the combustion chamber, so that at least one ignition gas channel, which begins in the rear face of the piston and terminates in the peripheral surface of the piston, is closed by the precombustion chamber wall, until the opening of the ignition gas channel in the piston peripheral face is displaced over and beyond the connecting edge between the precombustion chamber and combustion chamber.

Several ignition gas channels are preferably provided, which extend inclined to the longitudinal axis of the piston and commence in a central region of the rear face of the piston, in order to terminate in the piston peripheral face. The liquified gas channel consists preferably of two sections, with a first section extending axially to the piston being formed like a blind hole introduced into the front surface of the piston. The end of this first liquid gas channel section located in the piston is connected to several radially extending second liquified gas channel sections, which terminate in the peripheral surface of the piston. As a result of the construction of the liquified gas channels and the ignition channels described here, an issuing of liquified gas and combustion gases of the ignition charge at all sides around the piston in its region extending through the combustion chamber is achieved. The result thereby is an even ignition of the liquified gas in the whole combustion chamber.

Advantageously, the partition wall between the combustion chamber and the storage chamber is formed so as to be displaceable. In this way, the result is achieved that with increasing internal pressure in the combustion chamber, the partition wall is displaced into the storage chamber, in order to reduce the volume of the storage chamber. When the partition wall is displaced forward, pressure is exerted on the liquified gas located in the storage chamber, due to which further liquified gas is injected by way of the liquified gas channel from the storage chamber into the combustion chamber. The hot combustion gases of the combustion chamber thereby ignite the emerging and thereby volatilizing liquified gas, so that a self-sustaining combustion occurs in the combustion chamber. The pressure of the combustion gases on the partition wall can be affected by the number of outlet openings in the combustion chamber wall and their size. In this way the speed with which the partition wall is displaced forward can also be affected.

With the design of the gas generator according to the invention with a displaceable partition wall, in an advantageous further embodiment of the invention, it is provided that the piston is connected fixedly and undetachably to the partition wall at its end driven into the partition wall, therefore being displaced with the latter. This has the advantage that the same conditions relating to the dimensioning of the liquified gas channel apply for the issue of the liquified gas from the storage chamber into the combustion chamber over the whole combustion process. If the piston were to slip out of the partition wall when this is displaced, a connection which is substantially larger in cross-section would suddenly be created between the storage chamber and the combustion chamber. This would possibly be disadvantageous for the further process of combustion.

The connection between the piston and the partition wall occurs preferably as a result of the clamping action between the piston and the partition wall. The piston which, when the partition wall is displaceable should be displaced with this, is not held at its rear end, but is in this respect freely movable. When the partition wall is penetrated, a hole with a diameter tapering to the storage chamber forms for the clamping connection of the partition wall and piston. The formation of such a penetration hole can, for example, be achieved by corresponding previous working on the partition wall.

Another possibility for formation of the point of penetration of the partition wall consists in that the partition wall has in the region of its penetration position a reduced wall thickness. The partition wall therefore opposes the piston with a lower resistance when it is pierced. The partition wall is provided in the region of its thinned point of penetration with a conically tapering recess, which is formed on the side of the partition wall facing the piston. With a conically tapering front end of the piston, this piston end is wedged with the peripheral edge of the recess when the partition wall has been penetrated, so that the piston and partition wall are connected in a clamping manner. This clamping force must be sufficient in order to prevent release of the piston when the liquified gas pressure increases as a result of forward movement of the partition well.

Instead of a displaceable partition wall, according to a further advantageous embodiment of the invention there can also be used as storage chamber, a container which is accommodated in the housing and which deforms when the pressure is applied. With this embodiment of the invention, the piston, which penetrates a wall section of the container separating the storage chamber from the combustion chamber, also moves with the container when the container deforms. This embodiment of the invention has the advantage that there need not be provided any guidance of the partition wall, which can sometimes be structurally complex in order to prevent the partition wall from tilting.

In order to retain substantially the shape of the container wall section which the piston has penetrated when the container is deformed, and to which it is connected in a clamping manner, a rigid pressure plate is advantageously arranged on the outer side of this container wall section (inner face of the combustion chamber) by way of which the container is deformed when pressure is applied to the pressure plate and folds up, without the container wall section being substantially deformed in the region of the pressure plate. In this way a reliable seating of the piston end in the container wall can be guaranteed.

The gas generator according to the invention has been described up to now for the case where the liquid gas is accommodated in a single supply container or supply chamber in the housing. The term "liquified gas" is understood within the scope of this invention also to include liquified gas mixtures. With a liquified gas mixture, which consists of several liquified gas components, this liquified gas mixture is already present mixed in the storage container or in the storage chamber. Sometimes it can also be advantageous with a liquified gas mixture to store the components to be mixed separately from each other until being admitted into the combustion chamber. When using a liquid gas mixture of two liquified gas components, which should be accommodated separately from each other in the gas generator housing, two storage containers or two storage chambers each for a separate liquified gas component are provided in an advantageous embodiment of the invention. Both these containers or storage chambers lie advantageously in series in the direction of the piston movement so that a single piston can penetrate both storage containers or both storage chambers, with the piston being able to extend through the first storage container or storage chamber in the direction of the piston movement and, with its front end, penetrate the second storage container or storage chamber. In this connection, the piston is provided in its front section with two liquid gas channel systems separated from each other, one of which creates a connection between the first storage chamber and the combustion chamber and the second of which creates a connection of the second storage chamber with the combustion chamber. By arranging the openings of the liquified gas channel systems in question emptying into the storage chambers, the in-flow with respect to time of both liquid gas components at the beginning of the introduction of the combustion can be controlled with respect to time.

The first storage container preferably has a bay or cavity on its side facing away from the piston, in which the second storage container is contained. The first storage container has a reduced height (path to be travelled by the piston within the first storage container) in the region of the bay. Therefore the path to be travelled by the piston for penetrating or piercing both storage containers is kept short.

BRIEF DESCRIPTION OF THE DRAWINGS

Embodiments of the invention are further described with reference to the accompanying drawings, wherein.

DETAILED DESCRIPTION OF THE INVENTION

Figure 1:
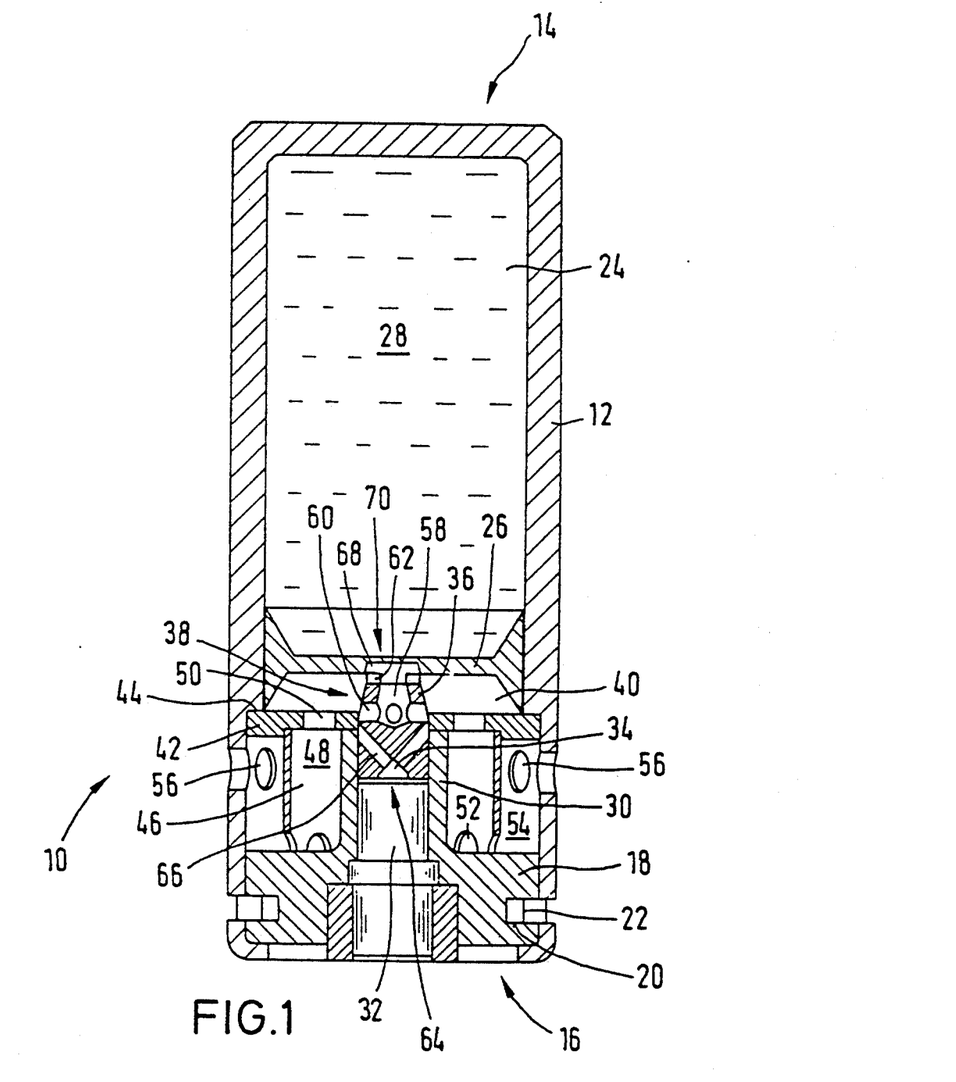
FIG. 1 shows, in longitudinal section, a cylindrical gas generator using liquified gas as gas-producing material and having a piston arranged in its position before ignition of the ignition charge.

In FIG. 1, there is shown, in longitudinal section, a cylindrical gas generator 10 which has a tubular housing 12. At its front end 14, the gas generator housing 12 is constructed to be integral with a peripheral wall section; whereas the other end 16 is closed by a sealing cover 18. The sealing cover 18 is surrounded by the peripheral wall section of the housing 12, and has a peripheral groove 20, into which are plunged, or inserted, internal projections 22 of the housing 12. The internal projections 22 are produced by notching the housing 12, the sealing cover 18 serving as a female mould. The internal projections 22 formed thus are extremely resistant with regard to the shearing stress when applying axially acting forces are applied to the sealing cover 18.

Formed in the housing 12 is a storage chamber 24 which is sealed relative to the remaining inner region or interior of the housing 12 by a partition wall 26, a peripheral edge of which lies on an inner face of the housing 12. The storage chamber 24 between the partition wall 26 and the upper end 14 of the housing 12 is completely filled with a liquified gas 28; for example, a mixture of 90 wt. % of nitrogen monoxide and 10 wt. % of industrial butane.

The sealing cover 18 has an inwardly directed central and coaxially arranged sleeve-like extension 30. In a cylindrical inner chamber 34 of the extension is accommodated an electrically actuated ignition device or igniter 32 with a pyrotechnical ignition charge (not shown). A housing of the ignition device 32 is fastened in the cylindrical inner chamber 34 of the extension 30 in such a way as to be secured against axial displacement. The inner chamber 34 forms a precombustion chamber, which is filled up by the hot combustion gases forming during combustion when the ignition device 32 is ignited. Also located in the cylindrical precombustion chamber 34, in addition to the ignition device 32, is a displaceable piston 36, which is guided on an internal surface of tho sleeve-like extension 30 in a longitudinally displaceable manner. The piston 36 is mainly accommodated in the internal chamber 34 and projects from the chamber only in the region of its front end 38. The front end 38 of the piston 36 is located in the actual combustion chamber 40, which is arranged between the precombustion chamber 34 and the partition wall 26. At the front end of the sleeve-like extension 30 of the sealing cover 13 there is arranged a plastic plate element 42, which has a central through passage for the piston 36 aligned with the cylindrical precombustion chamber 34. The plate element 42 is supported in an edge region of this passage against the front end of the sleeve-like extension 30 of the sealing cover 18; whereas, in its peripheral edge region the plate element rests on a peripheral shoulder 44 formed on the inside of the housing 12. Between the level section of the sealing cover 18 and the element 42 there is a further sleeve body 46, which has a greater internal diameter than the extension 30 of the sealing cover 18, and which is arranged concentrically to the extension 30. An annular chamber 48 is formed between the sleeve body 46 and the extension 30 is connected by way of openings 50 in the plate element 42 to the combustion chamber 40. Openings 52 at the lower edge section of the sleeve body 46 adjoining the sealing cover 18 create a fluid connection of the annular chamber 48 with a radially outwardly lying annular chamber 54 between the sleeve body 46 and the housing 12. The annular chamber 54 is provided with exit openings 56 in the housing 12 for the outflow of combustion gases from the combustion chamber 40 by way of both annular chambers 48, 54.

In its front end 38, the piston 36 is equipped with a liquid gas channel system, which has an axial first channel section 58, which terminates in the front (end) of the piston 36. Several radial second channel sections 60 open into a region of another end of the first channel section 58, which channel sections, for their part, terminate in the peripheral surface of the cylindrical piston 36. The front end of the first liquid gas channel section 58 is surrounded by tooth-like projections 62, which are formed on the front end 38 of the piston 36. In the region of its rear end 64, the piston 36 is provided with several ignition channels 66 extending inclined to the longitudinal axis of the piston 36. The ignition channels 66 begin in a central region of the rear end of the piston 36 and terminate in the peripheral surface of the piston 36. When the piston 36 is located in the precombustion chamber 34, the ignition channels 66 are closed, in part, by the inner face of the extension 30 and in part by the plate element 42.

Opposite the front end 38 of the piston 36, in a region of which the wall thickness of the partition wall 26 is reduced (see FIG. 1), there is formed in the partition wall 26 a conically tapering recess 68.

Figure 2:
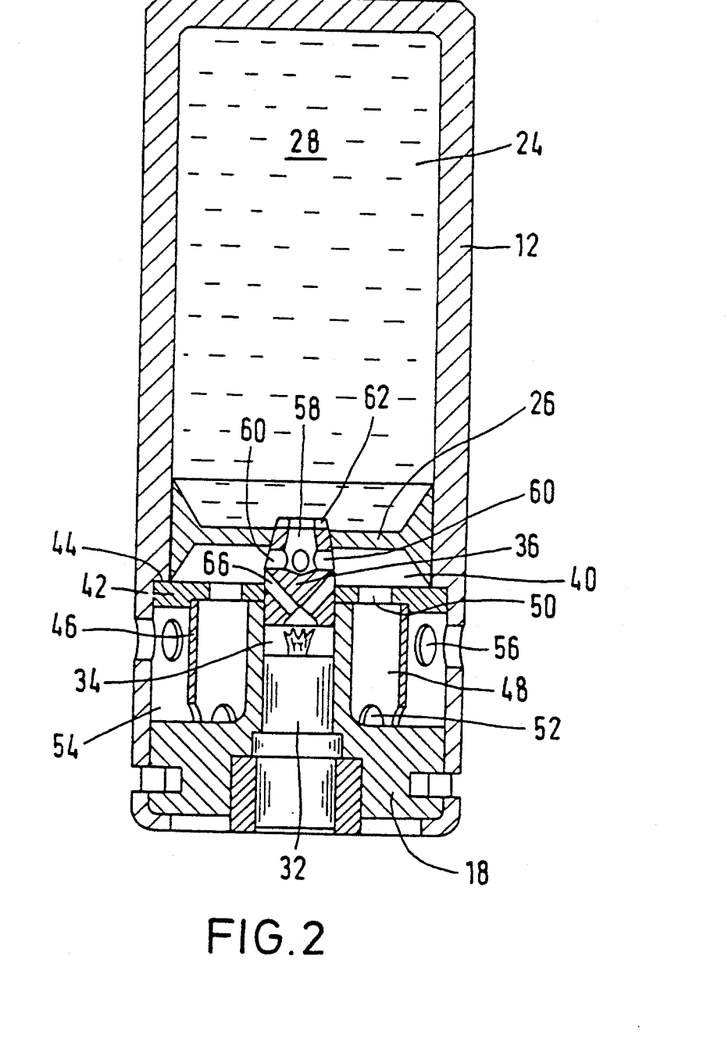
FIG. 2 shows a longitudinal section through the round gas generator according to FIG. 1 with a partition wall being penetrated by the piston between the storage chamber and combustion chamber.

The procedure of the gas generator 10 for igniting the liquified gas 28 is described hereinafter with reference to FIGS. 1 and 2. Initially, the pyrotechnical ignition charge of the ignition device 32 is ignited by means responsive to a predetermined acceleration or deceleration of the motor vehicle, with the combustion gases forming as a result filling up the precombustion chamber 34. Because of the rising pressure in the precombustion chamber 34, the piston 36 moves in the axial direction up to the partition wall 26 and penetrates the wall in the region of the recess 68. The piston 36 moves forward until, due to the shape of its conical front end 38 and the conical recess 68, an automatic locking occurs. In this state the piston 36 is wedged at its front end 38 with the partition wall 26 and held to the wall in a clamping manner. The partition wall 26 is thereby broken at the point of penetration 70 defined by the recess 68; the front end 38 of the piston 26 extends through this point of penetration 70 as represented in FIG. 2.

As soon as the partition wall 26 is penetrated by the front end 38 of the piston 36, the liquified gas 28 under pressure in the storage chamber 24 flows by way of the first and the second liquified gas channel sections 58, 60 into the combustion chamber 40. Because of its expansion in the combustion chamber 40 the liquified gas evaporates. Almost at the same time as the creation of the connection between the storage chamber 24 and the combustion chamber 40 by way of the channel sections 58, 60, the precombustion chamber 34 and the (main) combustion chamber 40 are also connected to each other by way of the ignition channels 66, so that, in addition to the liquified gas, the hot combustion gases from the combustion of the ignition charge also penetrate the combustion chamber 40. As is shown in FIG. 2, the ignition channels 66 terminate in the combustion chamber 40 above the plate element 42 when the front end 38 of the piston 36 penetrates the partition wall 26. The hot combustion gases ignite the inflowing liquified gas 28, so that combustion of the liquified gas 28 starts in the combustion chamber 40. The combustion gases forming as a result of the combustion lead to an increase in pressure in the combustion chamber 40. This combustion gas pressure acts on the partition wall 26 and moves the partition wall to the front end 14 of the housing 12. In this way the piston 36 held with its front end 38 clamped in the partition wall 26 is displaced with the partition wall 26, its rear end 64 moving out from the precombustion chamber 34. As a result of the forward displacement of the partition wall 26, the liquified gas 28 in the storage chamber 24 is constantly exposed to a pressure to cause the liquified gas 28 to flow out by way of the channel sections 58, 60 into the combustion chamber 40. Since hot combustion gases form or are present constantly in the combustion chamber 40, the combustion process of the liquified gas 28 is self-sustaining, so to speak, until all liquified gas 28 is injected from the storage chamber 24 into the ever growing combustion chamber 40. The hot combustion gases arrive from the combustion chamber in the annular chamber 48 by way of the openings 50 and go on from there by way of the openings 52 in the outer annular chamber 54 from where they emerge by way of the exit openings 56.

Catalysts of a suitable material in the form of throughflow sieves can be arranged, if desired, in one of the two annular chambers 48, 54, in order to start a secondary catalytic reaction of the combustion gases for reducing amounts of gas which are damaging to the health of the occupants.

A second exemplifying embodiment of a cylindrical gas generator with two separately stored liquified gas components will be described hereinafter with reference to FIGS. 3 and 4.

Figure 3:
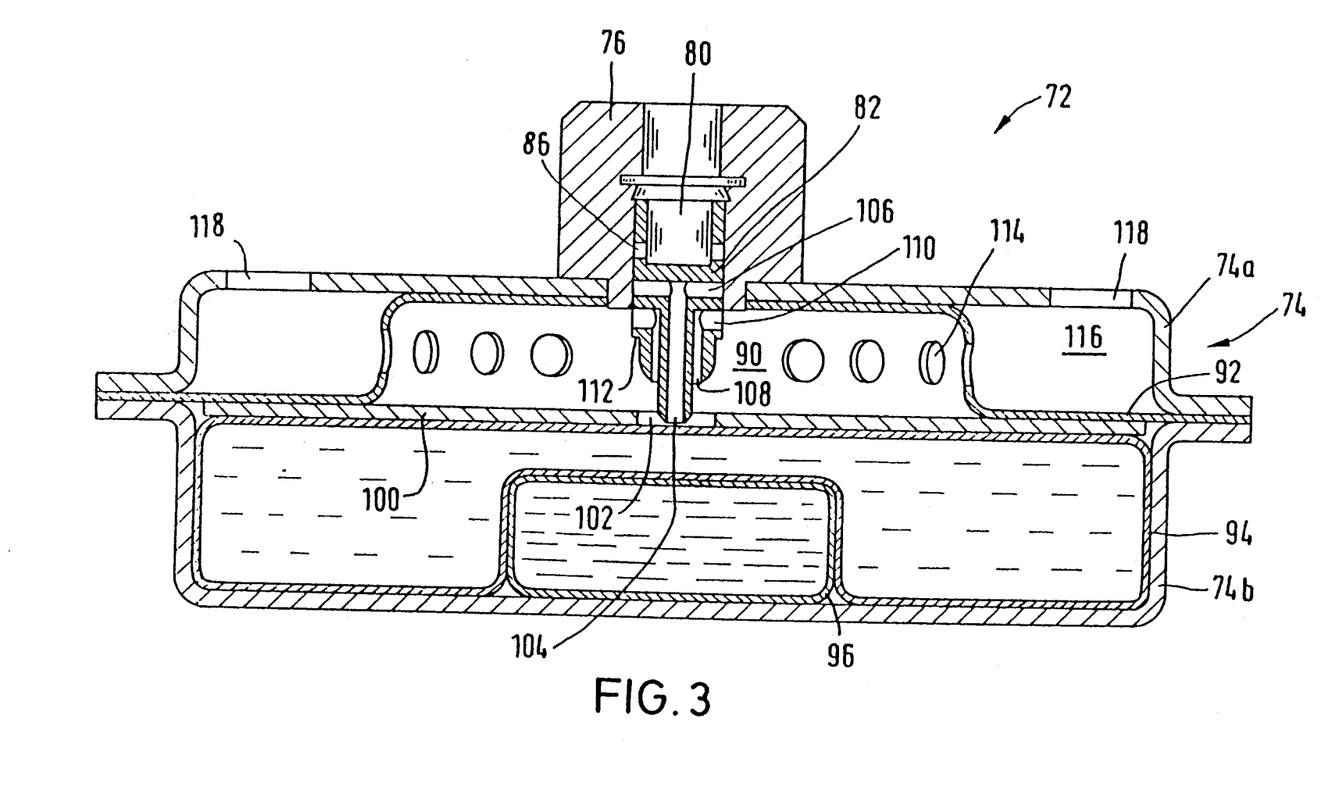
FIG. 3 shows a further exemplifying embodiment of a cylindrical gas generator, in longitudinal section, in which two storage containers are provided for two liquified gas components.
Figure 4:
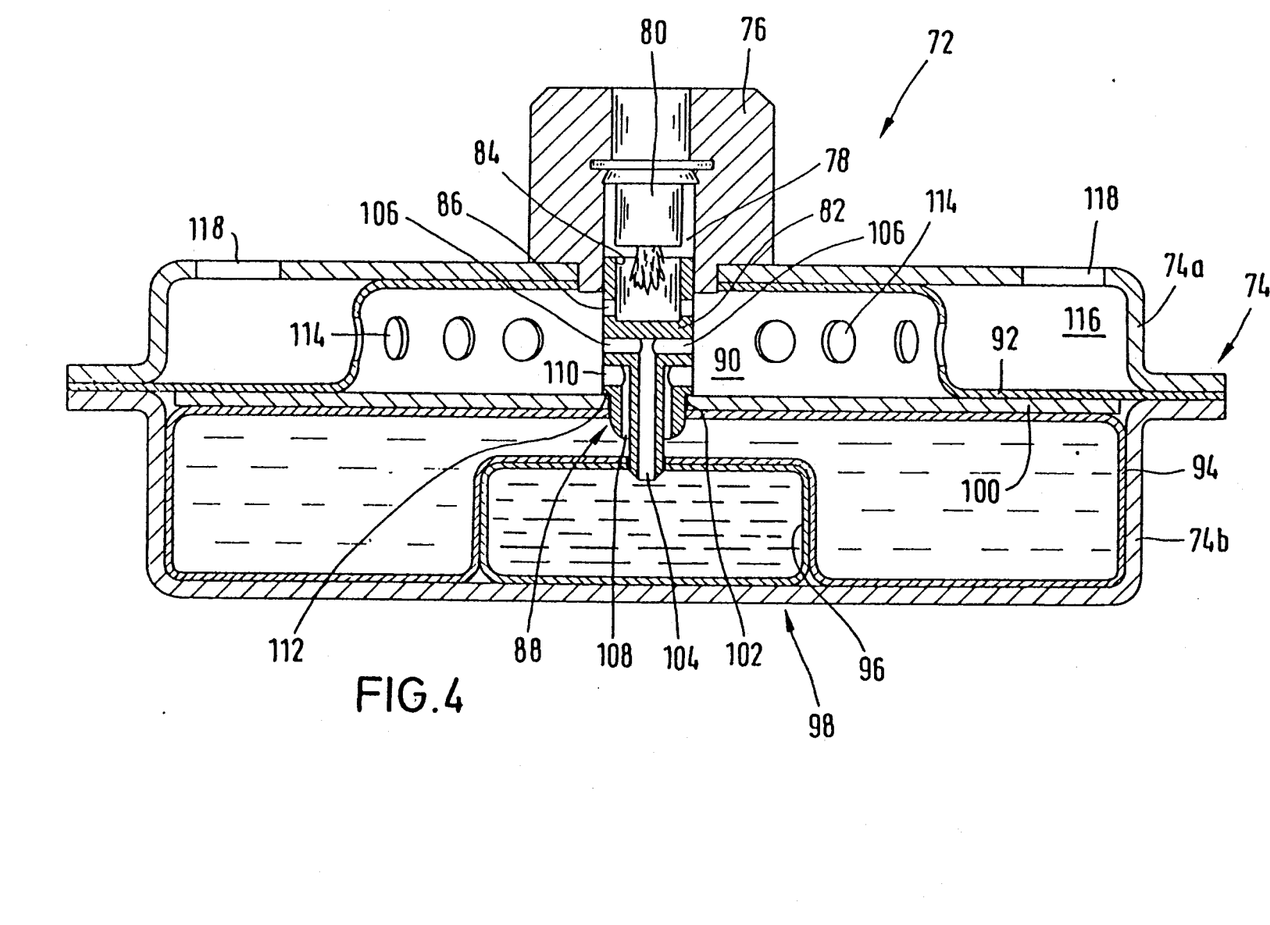
FIG. 4 shows a longitudinal section through the round gas generator according to FIG. 3 in which the walls of the storage have been penetrated by a piston.

The round gas generator shown in FIGS. 3 and 4 is provided with a two-part housing 74. The two housing halves 74a and 74b are connected to each other by way of annular flanges. A cylindrical holding block 76 is secured, centered in the middle, to the upper housing half 74a, in a cylindrical internal chamber 78 of which block (see FIG. 4), there is arranged an ignition device 80. The internal chamber 78 represents a precombustion chamber in which the combustion gases expand during combustion of the ignition charge. In the precombustion chamber 78, there is a displaceably guided piston 82, which has a cup-shaped hollowed rear end 84 surrounding the ignition device 80 or facing it. In the region of the rear end 84 of the piston 82, several radial ignition channels 86 are formed in the wall of the piston 82.

The front end 88 of the piston 82 projects from the precombustion chamber 78 into the (main) combustion chamber 90, which is formed concentrically in the upper housing section 74a and has a hat-like shape. The peripheral edge of a cup-shaped wall 92 defining the combustion chamber 90 extends between the flanges of both housing halves 74a, 74b; the wall 92 sits within the upper housing half 74a in its central region.

The region below the wall 92 is provided with two containers 94, 96, which are both completely housed in the lower housing section 74b. Both containers 94, 96 have a comparatively thin container wall which, as will be explained hereinafter, allows deformation of the containers when pressure is applied. The container 94 substantially fills the entire cross-section of the lower housing half 74b and has on its lower side a bay or cavity 98, into which the second container 96 is introduced in a substantially form-locking manner. The second container 96 is therefore enclosed by the container 94 as well as by a wall of the lower housing half 74b of the gas generator 72. In the two containers 94, 96 there are located different liquid gas components, which, as will be explained, are injected together into the combustion chamber 90.

Between the wall 92 defining the combustion chamber 90 and the container 94 there is arranged a rigid pressure plate 100, which in its central region separates the combustion chamber 90 from the container 94. A central opening 102 is formed, coaxially to the piston 82, in the pressure plate 100. In the region of the opening 102 the combustion chamber 90 and the internal chamber of the container 94 are only separated from each other by the thin wall of the container 94. Because of the bay 98 on the lower side of the container 94, the second container 96 is only spaced at a comparatively short distance from the combustion chamber 90 in the region of the opening 102 in the pressure plate 100, a portion of the container 94 extending between the container 96 and the combustion chamber 90.

As can be seen in FIGS. 3 and 4, two liquid gas channel systems separated from each other are formed in the front end 88 of the piston 82. These two liquified gas channel systems create a connection between an internal chamber of each container and the combustion chamber when the containers 94 and 96 are penetrated by the piston front end 88. A central first channel section 104, extending axially in the piston front end 88 belongs to the first liquified gas channel system, at the end of which section, lying in the piston 82, there open several radial second liquified gas channels 106, which for their part terminate in a peripheral face of the piston 82. An annular channel section 108 is formed around the liquified gas channel section 104 in the piston front end 88; this annular channel section 108 belongs to the second liquid gas channel system. One end of the annular channel section 108 lying in the piston 82 is also connected to radially extending channel sections 110, which terminate in the peripheral face of the piston 82. The channel sections 110 terminate as a result closer to the front end 88 of the piston 82 than is the case with the radial channel sections 106.

In the following there will be a brief description of the process occurring in the combustion chamber 90 for starting the ignition of both liquified gas components stored in the containers 94, 96. When igniting the ignition charge of the ignition device 80, excess pressure is produced in the precombustion chamber as a result of which the piston is moved forward axially away from the ignition device 80 in the direction of the two containers 94, 96. The front end 88 of the piston 82 penetrates the thin wall of the container 94 in the region of the pressure plate opening 102 when the piston 82 moves forward. Subsequently the piston front end 88 passes through the inner chamber of the container 94, until it has penetrated the two walls of the containers 94, 96 lying next to each other. As soon as the piston front end 88 plunges into the container 96, the internal chamber of the latter is connected by way of the channel sections 104 and 106 to the combustion chamber 90. As can be seen in FIGS. 3 and 4, the piston front end 88 is stepped, with the front end of the channel 104, when viewed in the direction of displacement of the piston 82, being introduced in advance of the front end of the annular channel section 108. Therefore while the channel 104 penetrates the second container 96 in the direction of displacement of the piston 82, when the piston 82 is driven into the containers 94, 96, the annular channel section 108 terminates in the container 94, as is shown in FIG. 4. The liquified gas located in the first container 94 arrives therefore in the combustion chamber 90 by way of the annular channel section 108 and the radial channel sections 110; this is because all radial channel sections 106 and 110 terminate in the same peripheral surface section of the piston 82, which is located inside the combustion chamber 90, when the front end 88 of the piston 82 is driven into the containers 94, 96. The forward displacement of the piston 82 is limited by a peripheral shoulder 112 on the piston 82, which comes into contact with an opening edge of the pressure plate 100. The diameter of the piston 82 in the region of the peripheral shoulder 112 is slightly greater than the internal diameter of the opening 102 in the pressure plate 100, so that the piston 88 is connected in a clamping manner to the pressure plate 100.

As can be seen in FIG. 4, not only are the containers 94, 96 connected to the combustion chamber 90 by way of the liquified gas channel systems allocated to them, but the precombustion chamber 78 is also connected to the combustion chamber 90 by way of the ignition channels 86 arranged at its exterior. The combustion gases of the precombustion chamber 78 arrive therefore in the combustion chamber 90 by way of the ignition channels 86, and, when in the combustion chamber, ignite the two components of liquified gases also flowing in.

When igniting the liquified gases in the combustion chamber 90 the internal pressure in this rises, with pressure being applied to the pressure plate 100. The containers 94, 96, which are slightly deformable because of their thin wall thickness, deform with the increasing combustion pressure with the result that the liquified gases from the containers 94, 96 are injected by way of the respective channel sections into the combustion chamber 90. The combustion gases emerge from the combustion chamber 90 by way of openings 114 formed in the wall 92, in order to flow into an annular chamber 116 between the wall 92 and the upper housing half 74a. The combustion gases arrive outside the housing by way of exit openings 118 formed in the upper housing half 74a.

Because of the deformability of both containers 94, 96, a self-sustaining combustion process occurs after the start of combustion of the liquified gases flowing into the combustion chamber 90, as further liquid gas is injected continuously into the combustion chamber due to the compression of the containers 94,96.

What is claimed is:

1. A gas generator for an inflatable impact cushion of a motor vehicle which comprises:
    a housing, in which a combustion chamber is formed;
    at least one outlet opening in a wall of the housing for emergence of combustion gases forming in the combustion chamber;
    a storage chamber for storing liquified gas within said housing, the storage chamber being separated from the combustion chamber by a partition wall;
    an ignition device, arranged adjacent to said combustion chamber, with an ignition charge for generating combustion gases for igniting the liquified gas; and
    a longitudinally displaceably guided piston which, when the ignition charge is ignited, is displaced in a direction of the partition wall and penetrates the partition wall due to the gas pressure formed, as a result of the combustion of the ignition charge;
    first channel means located in a region of a rear end of the piston in the direction of movement for allowing the combustion gases of the ignition charge to arrive in the combustion chamber, and second channel means in a region of a front end of the piston for allowing liquified gas from the storage chamber to arrive in the combustion chamber and to burn therein.

2. A gas generator according to claim 1, wherein said second channel means comprises at least one liquified gas channel which, when the piston is driven into and penetrates the partition wall, extends from the storage chamber to the combustion chamber and connects the storage chamber for entry of liquified gas into the combustion chamber and said first channel means comprises at least one ignition gas channel which extends from the ignition device to the combustion chamber, by way of which, when the piston is driven into and penetrates the partition wall, the combustion gases of the ignition charge flow into the combustion chamber.

3. A gas generator according to claim 2, wherein the piston is provided in a longitudinally displaceable manner to be adjacent a boundary wall of a precombustion chamber in which the ignition device is accommodated, and the at least one ignition channel is closed during forward movement of the piston along the boundary wall of the precombustion chamber wall, until, with its front end, the piston has penetrated and partition wall between the combustion chamber and the storage chamber.

4. A gas generator according to claim 2, wherein said at least one liquified gas channel comprises in a region of the front end of the piston in the direction of movement, a first liquified gas channel section open towards the front end of the piston and extending axially, which first liquified gas channel is connected to second liquified gas channel sections open towards a peripheral side surface of the piston and extending radially.

5. A gas generator according to claim 2, wherein said at least one ignition gas channel comprises plurality of ignition gas channels emanating from a central region of the rear face of the piston, extending inclined to a longitudinal axis of the piston and ending in a peripheral side surface of the piston.

6. A gas generator according to one of claims 1 and 2, wherein said front end of the piston has a tapered shape so that when the piston is driven into the partition wall, the piston front end is firmly connected to the partition wall in a clamping manner.

7. A gas generator according to one of claims 1 and 2, wherein the partition wall has a point or an area of penetration for the piston, and when the area is penetrated, a hole forms in the partition wall with a diameter narrowing towards the storage chamber.

8. A gas generator according to one of claims 1 and 2, wherein the partition wall has an area of penetration for the piston, in the region of which the partition wall has a reduced wall thickness.

9. A gas generator according to claim 8, wherein the partition wall has in a region of the area of penetration on a side facing the piston, a conically narrowing recess.

10. A gas generator according to claim 9, wherein the piston has a conically tapering front end and the front piston end is connected in a clamping manner to the partition wall when said wall is penetrated.

11. A gas generator according to claim 9, wherein the partition wall is arranged to be displaceably guided in the housing in a direction of piston movement, and the partition wall moves together with the piston, after the piston is driven to penetrate the partition wall due to rising combustion gas pressure in the combustion chamber, with the storage chamber being reduced in volume as the liquified gas is expelled into the combustion chamber.

12. A gas generator according to claim 1, wherein the storage chamber is defined by a first storage container which is deformable when pressure is applied thereto, said partition wall comprising a wall section of said first storage container separating the storage chamber from the combustion chamber.

13. A gas generator according to claim 12, wherein arranged inside the combustion chamber, there is a rigid pressure plate resting on the first storage container for pressing against the first storage container when the liquified gas is combusted and the pressure plate has an opening aligned with the area of penetration of the first storage container.

14. A gas generator according to claim 13, wherein a second storage container for additional liquified gas is provided in the housing, with the piston also penetrating the second storage container and the piston having at least one second liquified gas channel for connecting the second storage container with the combustion chamber when the piston is driven into a wall of said second storage container.

15. A gas generator according to claim 14, wherein both storage containers are arranged lying in series in the direction of the piston movement and the front end of the piston extends through the first storage container in the direction of the piston movement and then extends into the second storage container.

16. A gas generator according to claim 15, wherein the first storage container has, in the direction of the piston movement, on an end facing away from the piston a bay for accommodating the second storage container.

17. A gas generator for generating gas under pressure for inflating an inflatable impact cushion for protecting an occupant of a motor vehicle from injury, which comprises:
a housing;
a combustible gas-producing material for generating said gas under pressure, accommodated in the housing;
a combustion chamber arranged in the housing and separated by a partition wall from the gas-producing material;
a movable control means for penetrating said partition wall and for transferring the combustible gas-producing material into said combustion chamber;
and an ignitable ignition charge for igniting the gas-producing material; said gas-producing material being a liquified gas and being introduced into the combustion chamber via the movable control means when the ignition charge is ignited and when the movable control means is caused to penetrate the partition wall so that the ignition gas produced by said ignition charge entering into said combustion chamber causes combustion of the liquified gas and as a result of the combustion, the formation of the gas under pressure, which gas is discharged from the housing by at least one outlet opening provided in a housing wall.

* * * * *